May 22, 1934.  F. S. ARMSTRONG  1,960,076
COFFEE PERCOLATOR
Filed July 30, 1932

INVENTOR.
FRANK S. ARMSTRONG
BY Adam E. Fisher
ATTORNEY.

Patented May 22, 1934

UNITED STATES PATENT OFFICE 1,960,076

COFFEE PERCOLATOR

Frank S. Armstrong, Youngwood, Pa.

Application July 30, 1932, Serial No. 626,469

2 Claims. (Cl. 53—3)

My invention relates generally to improvements in coffee percolators and more particularly to a device for deflecting the hot percolating coffee away from the usual glass cap or dome and so protecting the same against breakage.

The main object of the invention is to provide a device which may be attached to the upper end of the usual tube conducting the water from the boiler to the coffee container or sieve and which includes dome or conically shaped deflectors which will prevent the water or coffee emerging from the tube from coming in contact with the usual glass cap in the top of the percolator and at the same time result in a more even distribution of the water over the coffee in its container.

Another object is to provide a device of this kind in a simple, inexpensive, durable and efficient form which may be readily mounted in the percolator for use as described.

With these and other objects in view the invention resides in the novel construction and arrangement of parts as hereinafter set forth and claimed, reference being had to the accompanying drawing wherein:

Figure 1:
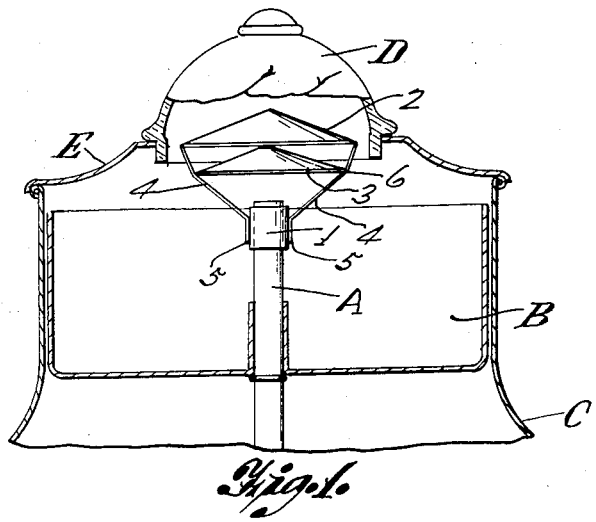
Figure 1 is a cross section through the upper portion of a percolator showing my invention properly mounted for use therein.
Figure 2:
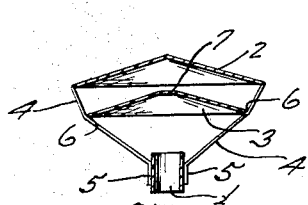
Figure 2 is a cross section through the deflector alone.
Figure 3:
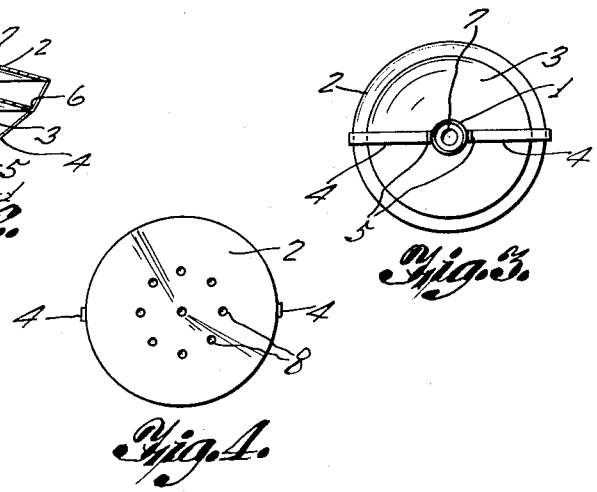
Figure 3 is an inverted plan view of the deflector.

Referring now more particularly to the drawing my invention comprises a tubular sleeve or socket 1, an upper dome or conically shaped deflector 2 and a lower and relatively smaller dome or conically shaped deflector 3. Supporting arms 4 are connected to or formed integrally with the peripheral margin of the upper deflector 2 and are bent downwardly and inwardly and terminate in parallel spaced feet 5 which are soldered or welded to the sleeve 1 at diametrically opposite points. The lower deflector 3 is supported within or between these arms 4 below the upper deflector 2 and is soldered or welded to these arms at the points 6. Preferably the arms 4 are bent relatively sharply inward from the points 6 toward the sleeve 1 thus forming rests to receive the lower deflector 3 and the arrangement is such that both deflectors are supported coaxially with the sleeve 1 and are spaced apart a substantial distance as shown. The lower deflector 3 is somewhat truncated and has an aperture 7 in its apex for a purpose to be described.

In use the sleeve 1 is slipped downwardly over and frictionally engages the upper end portion of the tube A which conducts the water and coffee up over the coffee container B mounted within the upper portion C of the usual percolator. The deflectors 2 and 3 are thus supported beneath and partially within the usual glass cap D in the percolator top E, the preferred position being illustrated in Figure 1. When so arranged the hot water gushing from the tube A will strike the underside of the lower deflector 3 and a part will pass through the aperture 7 therein and will strike the underside of the upper deflector 2 and thus the water in its entirety will be deflected away from the glass cap D and directed downwardly over the coffee in the container B and thence back to the boiler of the percolator. The cap D is thus protected from the heat of the water and is safeguarded against breakage. The shape of the deflectors 2 and 3 is such that in addition to protecting the cap D they further cause a more even distribution of the water over the coffee in container B as will be understood.

Figure 4:
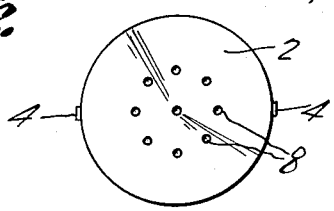
Figure 4 is a plan view of the deflector.

If desired the upper deflector 2 may have a number of perforations 8 as shown in Figure 4 to allow a part of the hot water to pass through the upper deflector, the apertures however being so small that the water cannot gush therethrough with sufficient force to strike the cap D. Obviously the device may be made in any size to fit percolators of different sizes and may be made of any suitable metal such as aluminum, stainless steel or the like.

While I have herein set forth a certain preferred embodiment of my invention it is understood that I may vary from the same in minor details so as best to construct a practical device for the purposes described, not departing from the spirit of the invention and within the scope of the appended claims.

I claim:

1. In a device of the kind described, a sleeve, an upper conical deflector, supporting arms extended from diametrically opposite points at the margins of the upper deflector and extending downwardly and slightly inwardly therefrom, a lower and relatively smaller conical deflector mounted below the said upper deflector and secured at its margins between the said arms, the said lower deflector having an aperture at its apex, the said supporting arms being bent sharply inward below the lower deflector to form rests therefor and being secured at their ends to the said sleeve.

2. In a device of the kind described, an upper conical deflector having a plurality of small perforations, supporting arms extending downward and inward from the upper deflector a short distance and then converging sharply inward, a sleeve secured between the lower ends of the supporting arms, and a lower and relatively smaller conical deflector secured between the supporting arms above and on the sharply converging portions thereof, the said lower deflector having an aperture at its apex.

FRANK S. ARMSTRONG.